Dec. 2, 1930.                O. HAJEK                1,783,646
                            STOP VALVE
                        Filed Dec. 31, 1926

O. Hajek
INVENTOR

By: Marks & Clerk
        Attys.

Patented Dec. 2, 1930

1,783,646

UNITED STATES PATENT OFFICE

OTTO HAJEK, OF VIENNA, AUSTRIA, ASSIGNOR TO THE FIRM OF ALEX. FRIEDMANN, OF VIENNA, AUSTRIA

STOP VALVE

Application filed December 31, 1926, Serial No. 158,382, and in Austria April 13, 1926.

The invention relates to improvements in pressure operated valves of the lift type for controlling the flow of fluid through an opening and especially to that type of valves in which the valve body proper is operatively connected with an elastic or flexible diaphragm, upon which the fluid pressure is acting. The object of this invention is to improve the above mentioned type of valves by reducing the wear of the parts and by protecting the sensitive members thereof in an effective manner.

Figure 1:
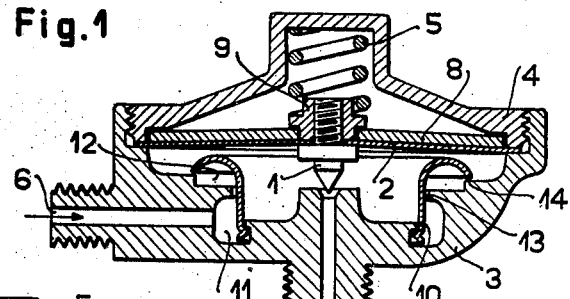
Figure 2:
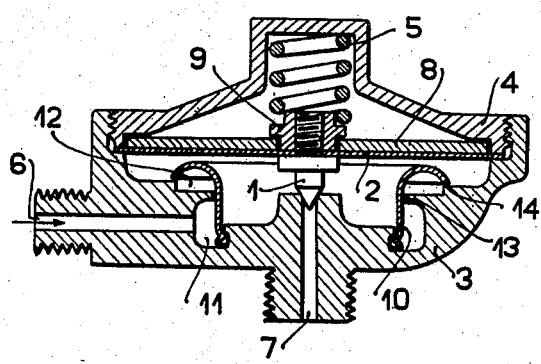
Figure 3:
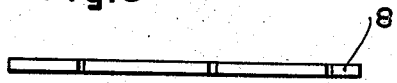
Figure 4:
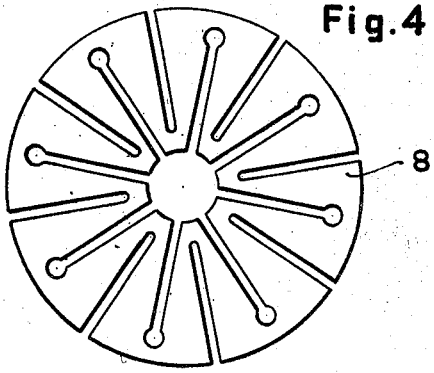

The invention is illustrated in the accompanying drawings, in which Fig. 1 shows a section through the valve casing and the various members contained therein, showing the valve in the lifted position. Fig. 2 shows a similar section through the valve mechanism with the valve body seated upon the valve seat. Fig. 3 is a side view of the supporting member of the diaphragm. Fig. 4 shows a top view upon said supporting member.

Referring to Figs. 1 and 2, 1 is the valve body proper, which is connected by means of a screw and a nut 9 with the diaphragm 2. The valve is enclosed in a casing 3, having a cover 4, adapted to receive a helical spring 5, which presses against the nut 9, thereby counteracting the fluid pressure upon the underside of the diaphragm and tending to force the valve upon its seat. A channel 7 is provided in the casing, which has an enlarged conical opening into which the conical point of the valve is entering. A second channel 6 provided in the casing is arranged for the admission of the fluid.

The diaphragm consists of a thin sheet or plate firmly clamped at its outer edge between the valve casing 3 and its cover 4 which are provided with a recess and a collar respectively, cooperating with each other so as to firmly grip the peripheral rim of the diaphragm between them.

Above the diaphragm a supporting plate 8 resting upon the diaphragm is arranged, the peripheral outer edge of which is clamped between the upper face of said diaphragm and a suitable seat in the cover 4, while its inner edge is clamped between a protruding collar of the nut 9 and the diaphragm. It is of advantage not to clamp the supporting member 8 firmly between the parts above mentioned and the diaphragm but to allow a certain play from .002" to .0008". The supporting plate 8 itself consists of a sheet of metal provided with a circular central opening and with radial slots which may either begin at the outer periphery and end near the central opening without however reaching the same or may be cut into the periphery of the central opening and end near the outer edge, or as shown in Fig. 4, the slots may run radially from the inner central as well as from the outer periphery alternatively.

The said supporting member 8 has for its object to prevent deformation of the diaphragm when subjected to heavy strain or on account of long use. To accomplish this object the supporting plate 8 rests upon the diaphragm, but is not clamped between the casing and the cover; it is only held against said diaphragm with a certain play by means of the cover 4. The supporting member may also consist merely of radial rods or bars fixed in the same way as the plate. This supporting member is moved with the diaphragm during oscillation of the same and takes up all the various forces which are acting in the direction of circles around the central point of the diaphragm, thereby preventing any local or general deformation of the same.

As will be seen the supporting member described differs essentially from the fixed stops hitherto employed which are arranged to limit the diaphragm movement, when it has reached a certain extent to avoid breaking of the same in the event of over-pressure. The member 8 oscillates with the diaphragm and is thereby supporting the same during oscillation in such a manner that at any stage or phase of oscillation a section through the diaphragm in radial direction will always show a straight line between the clamped edges. On the other hand during oscillation the supporting member will adopt along a circle around the center of the diaphragm a polygonal form and will therefore support the diaphragm around such a circle at a plurality of points thus protecting it efficiently against any local deformation even in cases of very high over-pressures.

To prevent the admission of solid particles carried with the fluid, which would be capable of damaging the valve body and when deposited upon the valve seat proper would interfere with the proper operation of the valve, the valve casing is provided with annular chambers 11, 12, in which all solid particles are retained and are deposited upon the bottom. These chambers are formed by means of the sleeve 10 surrounding the valve body and by means of recesses and protruding parts in the casing so as to form a series of chambers of annular shape which are connected with each other by means of relatively small passages 13, 14. The fluid admitted through the channel 6 is therefore compelled to change its direction repeatedly whereby, on account of the various changes in the cross section, depositing of the various impurities and solid particles is obtained. As these chambers are surrounding the valve seat, they are acting in the same way whether the casing is arranged horizontally or vertically.

What I claim is:—

1. A stop valve mechanism for controlling small quantities of fluid, comprising a casing, a flexible diaphragm and a stop valve operatively connected with said diaphragm, the diaphragm being clamped at its peripheral edge within said casing and centrally by the stop valve, a supporting member resting upon said diaphragm and in permanent contact therewith covering its whole surface, said member being loosely held at its peripheral edge within the casing and centrally by said diaphragm and stop valve, said supporting member consisting of a plate provided with a central opening and with a plurality of groups of radical slots, one group beginning at the outer periphery and converging towards the central opening without reaching the same, while a further group begins at the central opening and runs towards the peripheral edge without reaching the same.

2. A stop valve mechanism for controlling small quantities of fluid comprising a casing, a pressure chamber therein and a flexible diaphragm with a central opening within said casing closing said pressure chamber and firmly clamped at its peripheral edge within said casing, a stop valve clamping the central part surrounding the central opening of said diaphragm, a recess within each of said parts clamping the diaphragm, immediately above the part clamping the diaphragm, a supporting member for said diaphragm having substantially the same shape, covering its entire surface and permanently held against said surface by the recesses in the clamping parts immediately above the diaphragm, said supporting member being inserted with its peripheral and central edges loosely held between the diaphragm and within the recesses of the clamping parts immediately above the diaphragm, so that during movement of the diaphragm the support will follow exactly said movement without leaving the surface of said diaphragm and without impairing the free movement of the same, the supporting member consisting of a plate provided with slots beginning at one of the peripheral edges and dividing said supporting member into sections capable of relative limited movement to provide a limited flexibility of the supporting member and permit deformation of the diaphragm backed by said plate to a given extent but protecting said diaphragm against irregular and excessive deformation.

3. In a stop valve mechanism for fluid control, a casing and a valve body, a flexible diaphragm carrying said valve body, a supporting member resting upon said diaphragm and capable of oscillating with it, a sleeve within said casing surrounding the valve seat to form chambers between it and the casing, said chambers being between the inlet opening for the fluid and the valve controlled opening and connected with each other and with the valve chamber proper by means of passages of small cross section to retain solid particles carried by the fluid.

In testimony whereof I affix my signature.

OTTO HAJEK.